No. 837,901. PATENTED DEC. 4, 1906.
L. DE FOREST.
WIRELESS TELEGRAPHY.
APPLICATION FILED FEB. 14, 1906.

WITNESSES:
John Buckler,
A. E. Kaiser.

INVENTOR:
Lee de Forest
by Geo. A. Woodworth
Attorney.

UNITED STATES PATENT OFFICE.

LEE DE FOREST, OF NEW YORK, N. Y.

WIRELESS TELEGRAPHY.

No. 837,901.      Specification of Letters Patent.      Patented Dec. 4, 1906.

Application filed February 14, 1906. Serial No. 300,975.

*To all whom it may concern:*

Be it known that I, LEE DE FOREST, a citizen of the United States, and a resident of New York, in the county of New York and State of New York, have invented a new and useful Improvement in Wireless Telegraphy, of which the following is a specification.

My invention relates to wireless telegraphy and more particularly to an oscillation-detector which has a variety of uses, some of which are hereinafter set forth, and to systems in which said oscillation-detector is employed.

I have discovered that if the gaseous medium intervening between two separated electrodes be put into a condition of molecular activity by heating the same or otherwise putting it into a condition of molecular activity, said medium becomes highly sensitive to electrical oscillations. I have made the further discovery that the sensitiveness of an oscillation-detector comprising two electrodes separated by such sensitive gaseous medium may be varied, as, for example, by the action of a magnetic field, so that the response of said detector *per se* is a function of a characteristic, such as the frequency, of the electrical oscillations operating upon the same. Thus, for certain frequencies a magnetic field of given strength will greatly decrease the sensitiveness of the detector and render it practically non-responsive, while for other frequencies the same magnetic field will greatly increase the sensitiveness of the detector. In short, said detector *per se* may be made selectively responsive without having recourse to tuned or resonant circuits so that the use of such circuits may be dispensed with and the detector itself employed to perform the functions heretofore effected by said circuits. By virtue of this peculiar effect of a magnetic field on a detector whose sensitive element consists of a gaseous medium maintained in a condition of molecular activity, I am enabled to employ said detector provided with means for creating a stationary magnetic field as a tuning device and also as a static valve or leak; and I am enabled also to carry into effect the method of duplex wireless telegraphy described in my Letters Patent No. 772,879 granted October 18, 1904, by providing said detector with means for creating a magnetic field varying synchronously with the current in the primary power-circuit.

Figure 1:
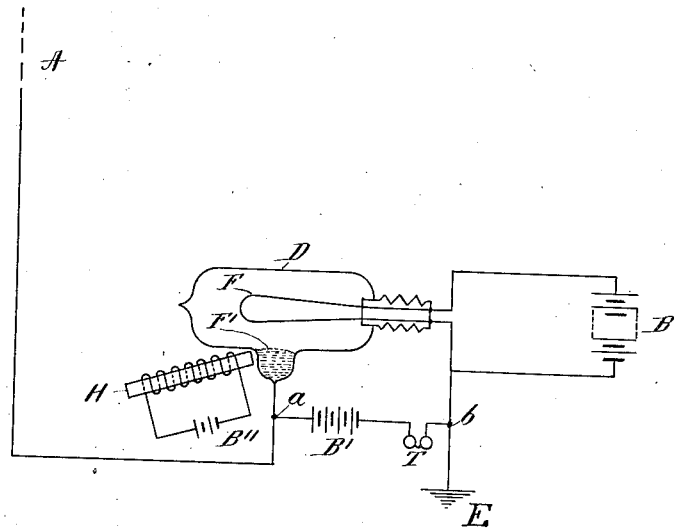
Figure 2:
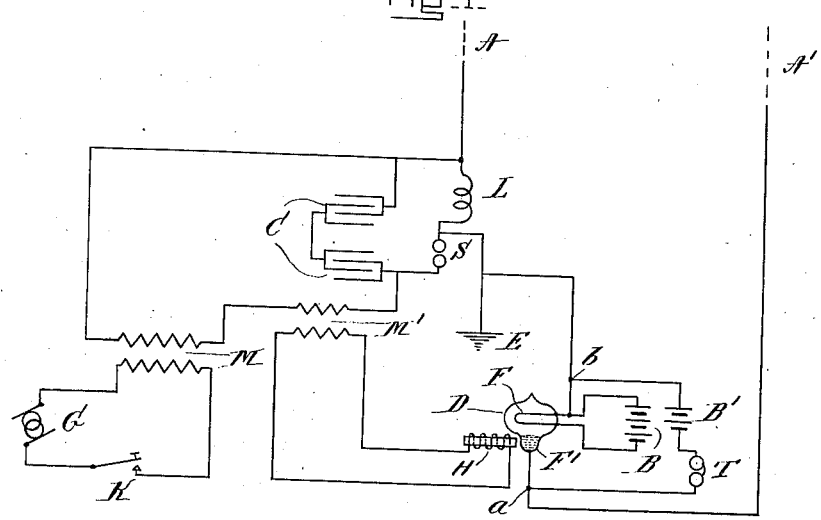

In the drawings which accompany and form a part of this specification, Figure 1 shows diagrammatically a simple and convenient embodiment of the present invention connected to a receiving-antenna and to a local circuit; and Fig. 2 shows diagrammatically a slightly different embodiment forming one of the elements of a duplex wireless telegraph system.

In both figures, D represents an evacuated vessel of glass or other suitable material having two separated electrodes F and F', between which intervenes the gaseous medium which when sufficiently heated or otherwise made highly conducting forms the sensitive element of my oscillation-detector. While various means may be employed for heating said gaseous medium, I find it more convenient to employ electrical means than to employ the heat of combustion, and therefore I prefer to employ as the electrode F a filament of carbon or platinum and to connect the same in series with a battery B having any suitable voltage,—for example, of from ten to fifteen volts. The electrode F' may consist, as shown, of a non-heated metallic body, such as mercury contained in a reservoir in the vessel D, in contact with a wire sealed in said vessel, or it may consist of any other suitable conducting material of appropriate shape and construction.

The two terminals *a*, *b*, of the detector may be connected in a wireless-telegraph-receiving system in any way in which oscillation-detectors are usually so connected, and, as shown, they are connected in series with the antenna A which may be earthed at E. A circuit, containing a battery B' of any suitable voltage,—for example of from five to ten volts,—and a signal-indicating device, such as the telephone T, is connected to the terminals *a*, *b*, so that the local circuit includes the battery B', telephone T, the electrodes F, F', and the sensitive conducting gaseous medium intervening between the latter.

H is an electromagnet energized by the battery B'', which may be employed to create a magnetic field for varying the sensitiveness of the oscillation - detector. If only one electrode is heated, the magnet may be placed close to the non-heated electrode to obtain the most marked results, but it produces a noticeable effect when placed anywhere in the immediate vicinity of the detector.

By means of the device shown in Fig. 1 I have been enabled to render the oscillation-detector non-responsive to waves of a given frequency and to render it responsive to waves of another and higher frequency, although when the magnet was removed from the detector, the response of the latter to the waves of lower frequency was far greater than to the waves of higher frequency.

By varying the position and strength of the magnetic field, the sensitiveness of the detector may be regulated with respect to the frequency of the waves to be received and may be made selective of waves of desired frequency so that the detector may be employed as a tuning device. The probable explanation is that the magnetic field retards the movements of the conducting ions in the gaseous medium and if said ions are moving under the influence of a rapidly-vibrating electromagnetic impulse the resultant effect from the magnetic field will be a function of the frequency or rate of vibration of said impulse, so that for a given field said resultant effect will be a maximum for a given frequency. On the same principle, I can employ said detector as a static valve or leak, or as a combined static valve and oscillation-detector. Inasmuch as static charges created in the antenna are usually unidirectional or of low frequency the magnetic field has a greater effect therein than on the high-frequency electrical oscillations created in said antenna by the waves to be received, and thereby the effects of such charges can be greatly diminished without altering the sensitiveness of the detector to said oscillations.

In Fig. 2, S C L is a sonorous circuit including the condensers C, spark-gap S and inductance L, conductively connected to the antenna A and energized by the transformer M, the primary of which is connected with the generator G and key K. A' is a receiving-antenna connected to the terminals a, b, of the oscillation-detector and grounded at E. In this case the circuit of the magnet H which as shown is placed close to the electrode F' is energized in any suitable manner by the current supplied to the sonorous circuit, so that the field created by said magnet will vary synchronously with said current. In the present instance the magnet H is shown connected to the secondary of the step-down transformer M' whose primary is included in series with the transformer M. Obviously, many other means may be employed in place of the transformer M'. The magnet H is so adjusted that the field produced thereby will render the detector non-responsive to the oscillations created by the transmitting system during every spark discharge and permit it to remain responsive all the remaining time. Inasmuch as the duration of a spark across the gap S is relatively short compared to the interval between two sparks, it will be seen, according to the principles explained in my above-mentioned Letters Patent, that messages may be received by the receiving system at the same time that messages are being sent by the transmitting system.

Various modifications of the oscillation-detector herein described may readily be devised by those skilled in the art and many changes may be made in the systems herein shown in which said detector may be employed, without departing from the principles of my invention.

I claim—

1. An oscillation-detector comprising two electrodes separated by a heated gaseous medium, one of said electrodes consisting of mercury.

2. An oscillation-detector comprising two electrodes separated by a gaseous medium maintained in a condition of molecular activity, one of said electrodes consisting of mercury.

3. An oscillation-detector comprising two electrodes separated by a sensitive conducting gaseous medium, one of said electrodes consisting of mercury.

4. An oscillation-detector comprising an evacuated vessel, a conductor sealed therein, means for causing an electric current to heat said conductor, a body of mercury in said vessel and a local circuit connected to said conductor and to said mercury.

5. An oscillation-detector comprising two electrodes separated by a heated gaseous medium, in combination with means for creating a magnetic field in proximity to said detector.

6. An oscillation-detector comprising two electrodes separated by a gaseous medium maintained in a condition of molecular activity, in combination with means for creating a magnetic field in proximity to said detector.

7. An oscillation-detector comprising two electrodes separated by a sensitive conducting gaseous medium, in combination with means for creating a magnetic field in proximity to said detector.

8. An oscillation-detector comprising two electrodes, means for heating one of said electrodes, and a magnet in proximity to the other of said electrodes.

9. An oscillation-detector comprising a gaseous medium and means for creating in proximity thereto a magnetic field of such strength that said detector is selective of oscillations of given frequency.

10. An oscillation-detector comprising two electrodes separated by a sensitive conducting gaseous medium, in combination with means for rendering the response of said detector per se a function of the frequency of the electrical oscillations operating upon the same.

11. A selectively-responsive oscillation-detector comprising a gaseous medium.

12. A selectively-responsive oscillation-detector comprising a gaseous medium and means for creating a magnetic field in proximity thereto.

13. A combined oscillation-detector and tuning device comprising a gaseous medium maintained in a condition of molecular activity.

14. A combined oscillation-detector and tuning device comprising a gaseous medium.

15. A combined oscillation-detector and static valve.

16. A combined oscillation-detector and static valve comprising a gaseous medium.

17. An electrical oscillation selecting device comprising an oscillation-detector and means for creating in proximity thereto a magnetic field of such strength that said detector thereby is rendered selective of electrical oscillations of given frequency.

18. An electrical oscillation selecting device comprising an oscillation-detector including a gaseous medium in a condition of molecular activity and means for rendering the response of said detector *per se* a function of the frequency of the electrical oscillations operating upon the same.

19. An electrical oscillation selecting device comprising an oscillation-detector including a sensitive conducting gaseous medium, in combination with means for rendering the response of said detector *per se* a function of a characteristic of the electrical oscillations operating upon the same.

20. An electrical oscillation selecting device comprising an oscillation-detector including a gaseous medium in a condition of molecular activity and means for rendering the response of said detector *per se* a function of a characteristic of the electrical oscillations operating upon the same.

In testimony whereof I have hereunto subscribed my name this 8th day of February, 1906.

LEE DE FOREST.

Witnesses:
J. H. HARRIS,
C. D. BABCOCK.